US007373799B2

(12) United States Patent
McLain et al.

(10) Patent No.: US 7,373,799 B2
(45) Date of Patent: May 20, 2008

(54) TESTING A FUEL TANK VACUUM SENSOR

(75) Inventors: Kurt D. McLain, Ortonville, MI (US); Michael A. Kropinski, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/965,379

(22) Filed: Oct. 14, 2004

(65) Prior Publication Data

US 2006/0081035 A1 Apr. 20, 2006

(51) Int. Cl.
*G01M 3/34* (2006.01)

(52) U.S. Cl. ........................................ 73/1.58; 73/49.3

(58) Field of Classification Search ................. 73/1.58, 73/40.5 R, 40.5 A, 45.3, 49.2, 49.3
See application file for complete search history.

(56) References Cited

U.S. PATENT DOCUMENTS

| | | | | |
|---|---|---|---|---|
| 5,490,414 | A * | 2/1996 | Durschmidt et al. | 73/49.2 |
| 6,321,727 | B1 | 11/2001 | Reddy et al. | |
| 6,550,316 | B1 | 4/2003 | Wong et al. | |
| 6,684,151 | B1 * | 1/2004 | Ring | 701/110 |
| 2001/0042399 | A1 * | 11/2001 | Dawson et al. | 73/49.7 |
| 2004/0068360 | A1 * | 4/2004 | Saito et al. | 701/114 |

* cited by examiner

*Primary Examiner*—Hezron Williams
*Assistant Examiner*—Paul M West

(57) ABSTRACT

A method of determining whether a vacuum/pressure sensor in a vehicle fuel tank correctly indicates a vacuum level in the tank. An input from the sensor is obtained. The tank is sealed for a predetermined time period. After the time period, another input is obtained from the sensor and the sensor inputs are compared.

11 Claims, 4 Drawing Sheets

TESTING A FUEL TANK VACUUM SENSOR

FIELD OF THE INVENTION

The present invention relates generally to vehicle fuel systems and more particularly to diagnosing conditions in vehicle fuel tanks.

BACKGROUND OF THE INVENTION

Vacuum/pressure sensors are commonly used in vehicle fuel tanks to monitor tank vacuum levels. When a vacuum/pressure sensor fails to operate properly, the sensor may indicate a constant vacuum level, even while vacuum is actually being increased (i.e., pressure is being reduced) in the tank. If a vacuum/pressure sensor fails to operate and its failure is not detected, the fuel tank can become damaged when excessive vacuum is applied. On the other hand, a properly operating vacuum sensor may register a constant vacuum level when a leak in the tank is sufficiently large to prevent vacuum in the tank from increasing.

SUMMARY OF THE INVENTION

The present invention, in one embodiment, is directed to a method of determining whether a vacuum/pressure sensor in a vehicle fuel tank correctly indicates a vacuum level in the tank. An input from the sensor is obtained. The tank is sealed for a predetermined time period. After the time period, another input is obtained from the sensor and the sensor inputs are compared.

In another configuration, the invention is directed to a method of determining whether a vacuum/pressure sensor in a vehicle fuel tank correctly indicates a vacuum level in the tank. The method includes determining a target vacuum level to be reached in the tank. A first value is obtained from the sensor. It is determined whether the first value indicates that the target vacuum level is being reached. Based on the determining, the following steps are performed. A second value is obtained from the sensor. The tank is sealed for a predetermined time period. After the time period, a third value is obtained from the sensor and the second and third values are compared.

In another configuration, a system for determining whether a vacuum/pressure sensor in a vehicle fuel tank correctly indicates a vacuum level in the tank includes a control module that determines a target vacuum level to be reached in the tank. The control module obtains a first indication from the sensor and determines whether the first indication indicates that the target vacuum level is being reached. Based on the determination, the control module obtains a second indication from the sensor and seals the tank for a predetermined time. After the predetermined time, the control module obtains a third indication from the sensor and compares the second indication with the third indication.

In yet another configuration, a diagnostic system in a vehicle includes a vacuum/pressure sensor in a fuel tank of the vehicle. A control module obtains an indication from the sensor and seals the tank for a predetermined time. After the predetermined time, the control module obtains another indication from the sensor and compares the sensor indications to determine whether the sensor correctly indicates a vacuum level in the tank.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

Figure 1:
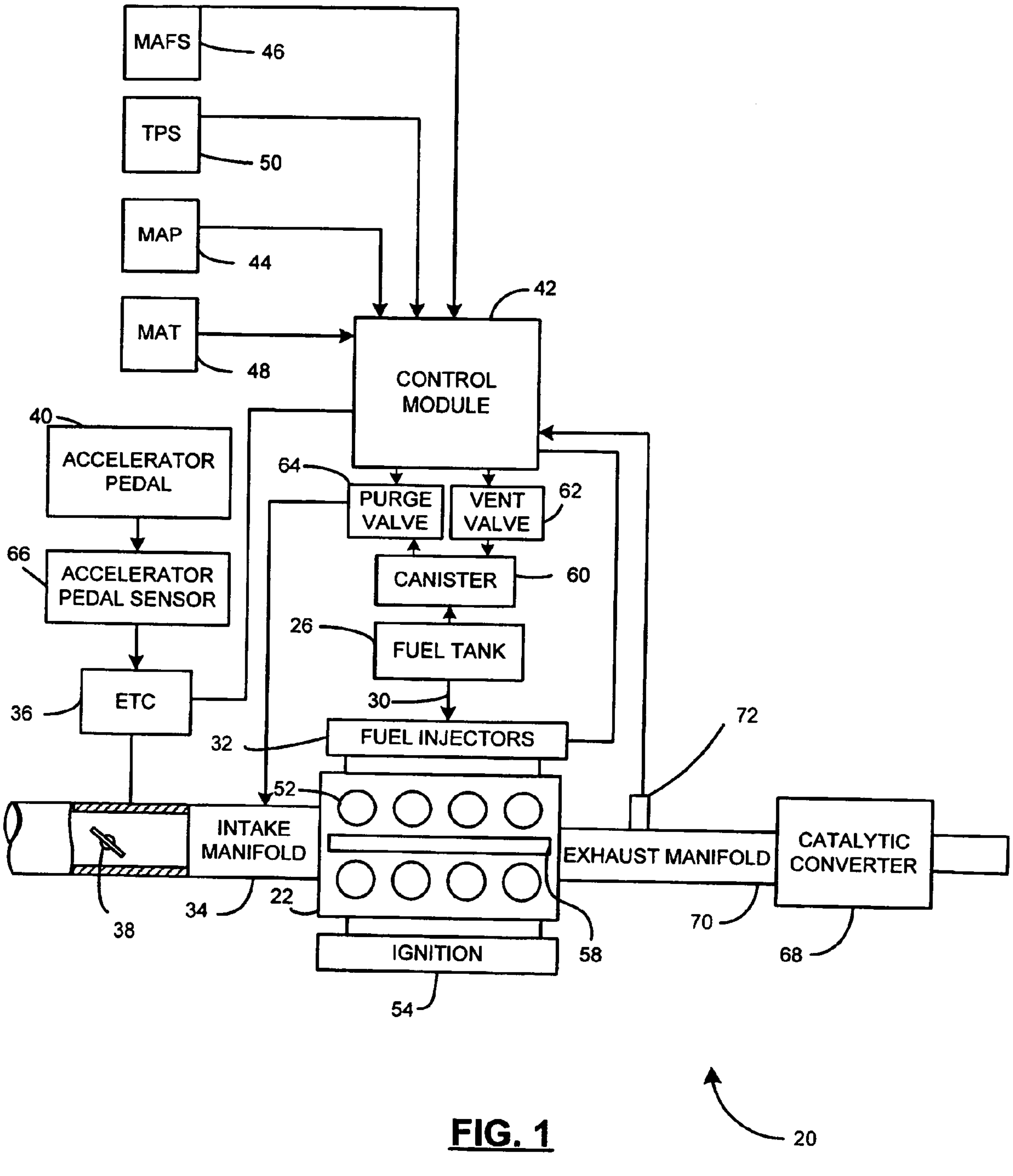
FIG. 1 is a block diagram of a vehicle including a diagnostic system in accordance with one configuration of the present invention.

The following description of various embodiments of the present invention is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, a vehicle including a diagnostic system in accordance with one embodiment of the present invention is indicated generally by reference number 20. Fuel is delivered to an engine 22 from a fuel tank 26 through a fuel line 30 and through a plurality of fuel injectors 32. Air is delivered to the engine 22 through an intake manifold 34. An accelerator pedal sensor 66 senses a position of an accelerator pedal 40 and sends a signal representative of the pedal position to an electronic throttle control (ETC) module 36. The ETC module or ETC 36 adjusts a throttle plate 38 that is located adjacent to an inlet of the intake manifold 34 based upon the position of the accelerator pedal 40 and a throttle control algorithm that is executed by a control module 42. In controlling operation of the vehicle 20, the control module 42 may use a sensor signal 44 indicating pressure in the intake manifold 34. The control module 42 also may use a sensor signal 46 indicating mass air flow entering the intake manifold 34 past the throttle plate 38, a signal 48 indicating air temperature in the intake manifold 34, and a throttle position sensor signal 50 indicating an amount of opening of the throttle plate 38. In some embodiments, the ETC 36 and the control module 42 may be integrated as an engine control module (ECM). Still other variations will be apparent to skilled artisans.

The engine 22 includes a plurality of cylinders 52 that receive fuel from the fuel injectors 32 to drive a crankshaft 58. Vapor from the fuel tank 26 is collected in a charcoal storage canister 60. The canister 60 may be vented to air through a vent valve 62. The canister 60 may be purged through a purge valve 64. When vapor is purged from the canister 60, it is delivered to the intake manifold 34 and burned in the engine cylinders 52. The control module 42 controls operation of the vent valve 62, purge valve 64, fuel injectors 32 and ignition system 54. A catalytic converter 68 receives exhaust from the engine 22 through an exhaust manifold 70. An exhaust sensor 72 senses exhaust in the manifold 70 and delivers a signal to the control module 42.

Figure 2:
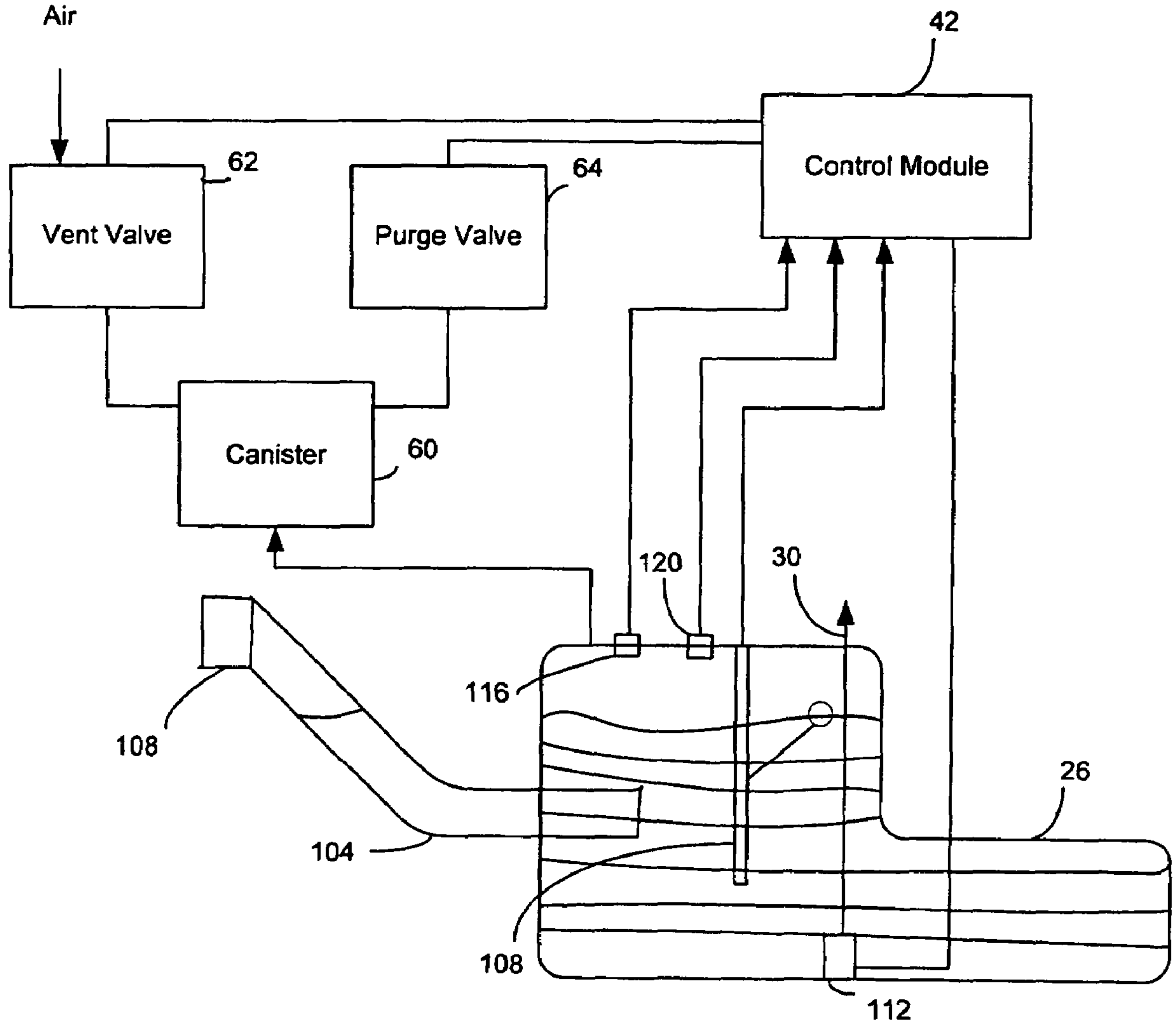
FIG. 2 is a block diagram of a fuel tank and related elements of a vehicle including a diagnostic system in accordance with one configuration of the present invention.

The fuel tank 26 is shown in greater detail in FIG. 2. The tank 26 includes a filler conduit 104 and a gas cap 108. A fuel meter 108 indicates to the control module 42 a level of fuel in the tank 26. A fuel pump 112 delivers fuel from the tank 26 through the fuel line 30. A temperature sensor 116 senses temperature inside the tank 26 and sends a signal indicating the sensed temperature to the control module 42. A pressure/vacuum sensor 120 senses pressure and vacuum in the fuel tank 26 and sends a signal indicating the sensed pressure/vacuum to the control module 42.

In one configuration of the present invention, the control module 42 monitors operation of the pressure/vacuum sensor 120 during operation of the vehicle 20. A target vacuum level in the tank 26 is determined and a plurality of values are obtained from the sensor 120. If the values received from the sensor 120 during vehicle operation indicate a steady value and/or indicate that the target vacuum level is not being reached, the control module 42 performs further diagnostics as further described below.

Figure 3:
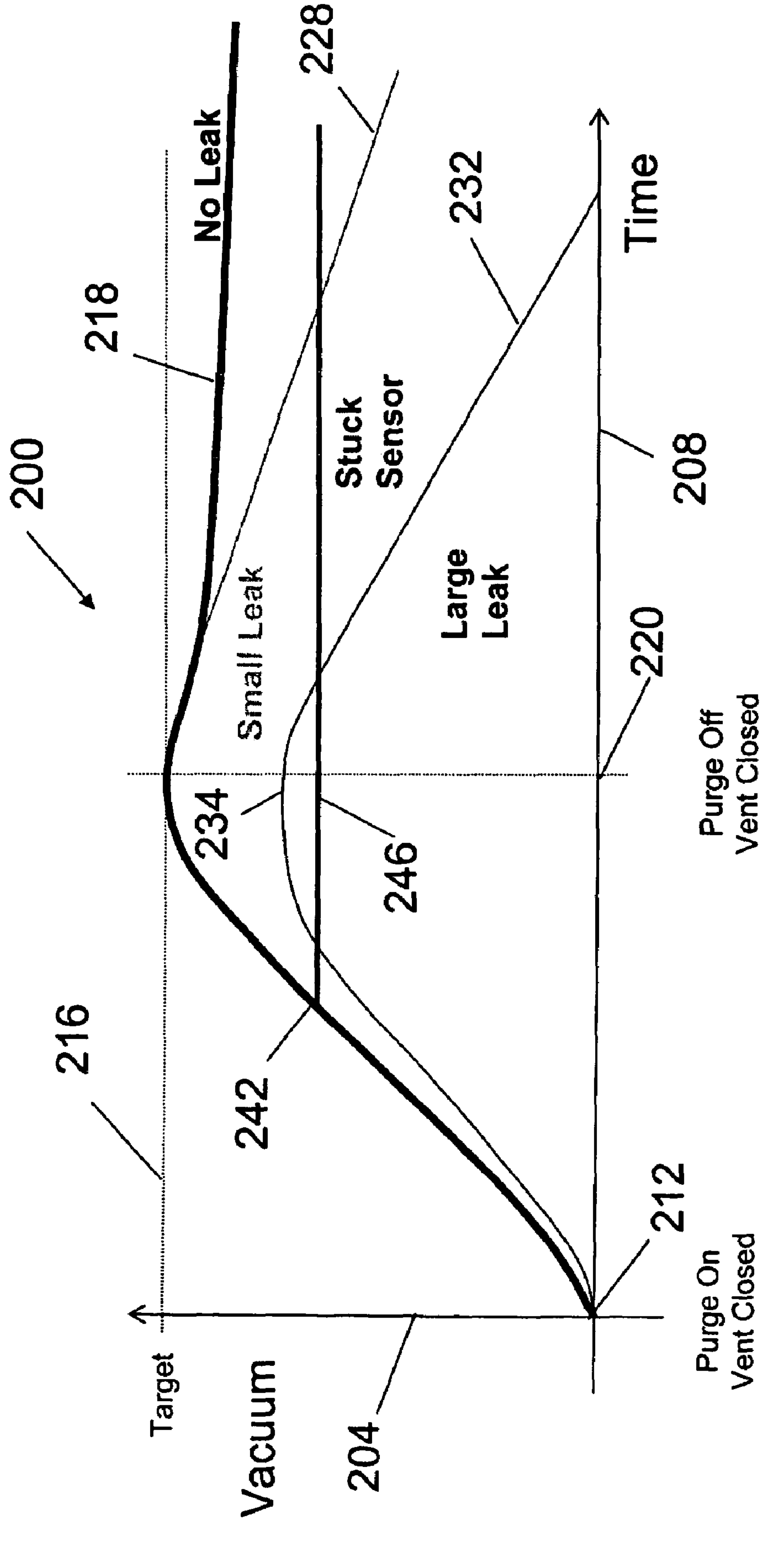
FIG. 3 is a graph showing vacuum levels in a vehicle fuel tank over time.

Implementations of the foregoing method may be further explained with reference to a graph indicated generally by reference number 200 in FIG. 3. The graph 200 illustrates tank vacuum levels 204 over time 208 as may be indicated by the sensor 120. Time 208 begins at a point 212 when a vacuum is applied to the tank 26, e.g., by opening the purge valve 64 and closing the vent valve 62, to reach a target vacuum level 216. When the tank 26 has no leaks and the sensor 120 is operating properly, the sensor 120 produces values indicated by a curve 218. When the target vacuum level 216 is reached, the sensor 120 indicates the target vacuum level 216 at a point in time 220. If at time 220 the tank 26 is sealed by closing the vent and purge valves 62 and 64, the vacuum level in the tank 26 decreases from the target level 216 only slightly over time.

When a small leak is present in the tank 26 and the sensor 120 is operating properly, the sensor 120 produces values indicated by a curve 228. The target vacuum level 216 can be reached at time 220 when vacuum is applied to the tank 26 in the presence of a small leak. When the tank 26 is sealed at the time 220, however, the tank vacuum level decreases gradually over time, at a rate faster than in the absence of a leak.

When a large leak is present in the tank 26 and the sensor 120 is operating properly, the sensor 120 produces values indicated by a curve 232. The target vacuum level 216 cannot be reached when vacuum is applied to the tank 26 in the presence of a large leak. For example, a vacuum indicated by point 234 is a maximum vacuum that can be reached in the tank 26. When the tank is sealed at time 220, the tank vacuum level decreases rapidly relative to the small leak curve 228. Thus the term "large leak", as used herein, refers to a leak that prevents a target vacuum from being reached. A "small leak", as used herein, refers to a leak that does not prevent a target vacuum from being reached.

When the pressure/vacuum sensor 120 begins to fail, it may, for example, sense a particular pressure/vacuum and then "get stuck", i.e., become unable to indicate other values. Referring to FIG. 3, for example, when vacuum is applied at time 212 to reach the target vacuum 216, the sensor 120 operates correctly until it reaches a value 242. The sensor 120 continues to indicate the value 242 over time, as indicated by a line 246, both before and after the tank is sealed at time 220.

Figure 4:
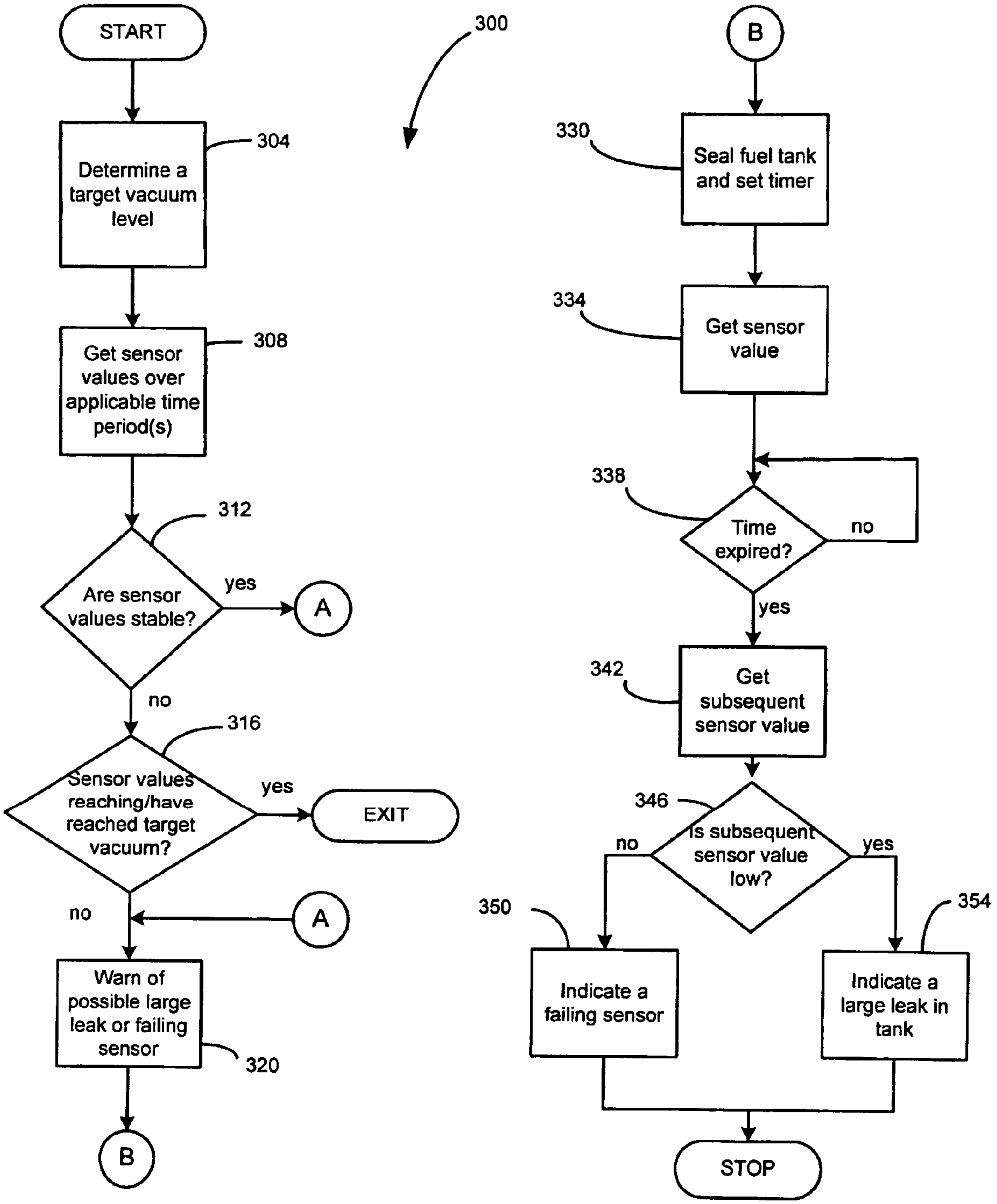
FIG. 4 is a flow diagram of one implementation of a method of determining whether a vacuum/pressure sensor correctly indicates a vacuum level in a fuel tank.

A flow diagram of an exemplary method of determining whether the vacuum/pressure sensor 120 correctly indicates a vacuum level in the tank 26 is indicated generally in FIG. 4 by reference number 300. The method 300 may be performed by the control module 42 during vehicle operation on a regular basis, for example, at cold starting of the engine 22. Referring now to FIG. 4, the control module 42 determines a target vacuum level to be reached in the tank 26 in step 304. The target vacuum level depends on a plurality of factors, which may include but are not limited to a fuel level in the tank 26, rate of fuel consumption and/or temperature in the tank 26. In the present configuration, the control module 42 applies a vacuum to the tank by opening the purge valve 64 and closing the vent valve 62. The control module 42 may apply vacuum for a predetermined time associated with achieving a particular target vacuum level. Additionally or alternatively, the control module 42 may dynamically determine how long to apply vacuum.

In step 308, the control module 42 obtains a plurality of pressure/vacuum indications from the vacuum sensor 120 over an applicable time period. An "applicable time period" may be, for example, one or more ignition cycles of the engine 22, all or part of a time period associated with achieving the particular target vacuum level, and/or other or additional time period(s) over which the sensor 120 indications would be sufficient to indicate whether the target vacuum level is being reached.

In step 312, the control module 42 determines whether the values obtained from the sensor 120 are stable, that is, whether they indicate a steady value. If in step 312 it is determined that the sensor 120 values do not indicate a steady value, control passes to step 316. It should be understood that the term "steady value" in the present context refers to an essentially steady value, subject to any variation that might be appropriately included in the sensor 120 value when evaluating a possible stuck sensor.

If in step 312 the sensor 120 values indicate that a vacuum in the tank 26 has reached a steady value, then in step 320 the control module 42 stores a fault indication in its memory and issues a warning of a possible large leak or a failing vacuum/pressure sensor. After the warning is issued in step 320, control passes to step 330.

In step 316, the control module 42 determines whether the values obtained from the sensor 120 indicate that the target vacuum level is being reached or has been reached. If the target vacuum level is being or has been reached, control exits from the method 300. If in step 316 it is determined that the target vacuum level is not being reached, then in step 320 the control module 42 stores a fault indication in its memory and causes a warning message to be displayed. Control then passes to step 330.

In step 330, the control module 42 seals the fuel tank 26 and sets a timer (not shown) for a predetermined time. The time period over which the tank 26 remains sealed is sufficiently long to allow a vacuum level in the tank 26 to decrease to a low level in the event of a large leak in the tank 26. A "low" level includes a level (such as that indicated by line 232 in FIG. 3) that would be distinguishable from a stable value (such as that indicated by line 246 in FIG. 3) that would be produced if the sensor 120 were in a failure mode. In step 334 the control module 42 obtains a value from the sensor 120. The control module 42 checks the timer in step 338. If the time period has not expired, control returns to step 338. If the time period has expired in step 338, control passes to step 342.

In step 342, the control module 42 obtains a subsequent indication from the vacuum/pressure sensor 120. In step 346, the subsequent sensor indication is compared with the value previously indicated by the sensor 120 in step 334. If the subsequent indication is essentially equal to the previous sensor value, then in step 350 the control module 42 indicates that the sensor 120 is failing. If the subsequent sensor value indicates that a vacuum level in the tank 26 has reached a low level compared to the previous sensor value, then in step 354 the control module 42 indicates that a large leak is present in the tank 26.

Implementations of the foregoing method and system can be used to detect a failing pressure/vacuum sensor, which previously was not possible to detect during vehicle operation. Because a failing sensor can be detected sooner than previously possible, excessive vacuum in a fuel tank can be prevented. Replacing a sensor is less expensive than replacing a damaged fuel tank, and so repair costs are reduced.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method of determining whether a vacuum/pressure sensor in a vehicle fuel tank correctly indicates a vacuum level in the tank, said method comprising:

determining a target vacuum level to be reached in the tank;

obtaining a first value from the sensor in the tank;

determining whether the first value indicates that the target vacuum level is being reached, wherein a second value is obtained from the sensor, the tank is sealed for a predetermined time period when the first value indicates that the target vacuum level is being reached, after said time period, a third value is obtained from the sensor, and determining whether the sensor is unable to indicate varying vacuum levels in the tank based on a comparison of the second and third values.

2. The method of claim 1 wherein the vehicle includes a canister for recovering vapor from the tank, said method further comprising opening a purge valve of the canister and closing a vent valve of the canister to reach the target vacuum level.

3. The method of claim 1 performed using a control module of the vehicle.

4. The method of claim 1 wherein the vehicle includes a canister for recovering vapor from the tank, and wherein said step of sealing the tank comprises closing a purge valve and a vent valve of the canister.

5. The method of claim 1 performed while an engine of the vehicle is operating.

6. A system for determining whether a vacuum/pressure sensor in a vehicle fuel tank correctly indicates a vacuum level in the tank, said system comprising a control module that:

determines a target vacuum level to be reached in the tank;

obtains a first indication from the sensor in the tank;

determines whether the first indication indicates that the target vacuum level is being reached; and obtains a second indication from the sensor and seals the tank for a predetermined time when the first indication indicates that the target vacuum level is being reached;

wherein the control module obtains a third indication from the sensor after the predetermined time and compares the second indication with the third indication to determine whether the sensor is unable to indicate varying vacuum levels in the tank based on the inputs.

7. A system for determining whether a vacuum/pressure sensor in a vehicle fuel tank correctly indicates a vacuum level in the tank, said system comprising a control module that:

determines a target vacuum level to be reached in the tank;

obtains a first indication from the sensor in the tank;

determines whether the first indication indicates that the target vacuum level is being reached; and based on said determination:

obtains a second indication from the sensor and seals the tank for a predetermined time;

after the predetermined time, obtains a third indication from the sensor and compares the second indication with the third indication to determine whether the sensor is in a failure mode; and indicates a leak in the tank if the second and third indications are unequal.

8. The system of claim 7 wherein said control module indicates that the sensor is in a failure mode if the second and third indications are equal.

9. The system of claim 7 further comprising a fuel vapor canister fluidly connected with the tank and having a purge valve that controls delivery of fuel vapor to an engine of the vehicle and a vent valve that controls intake of air into said canister, wherein said control module opens said purge valve and closes said vent valve to reach the target vacuum level.

10. The system of claim 7 further comprising a fuel vapor canister fluidly connected with the tank and having a purge valve that controls delivery of fuel vapor to an engine of the vehicle and a vent valve that controls intake of air into said canister; wherein said control module closes said purge valve and said vent valve to seal the tank.

11. The system of claim 7 wherein said control module associates a result of the comparing with at least one of a large leak in the tank and faulty operation of the sensor.

* * * * *